United States Patent [19]

Kanbe et al.

[11] 4,368,687

[45] Jan. 18, 1983

[54] METHOD AND APPARATUS FOR DEVELOPING MAGNETIC LATENT IMAGE

[75] Inventors: Junichiro Kanbe, Tokyo; Nagao Hosono, Chofu; Tohru Takahashi, Tokyo, all of Japan

[73] Assignee: Canon Kabushiki Kaisha, Tokyo, Japan

[21] Appl. No.: 226,048

[22] Filed: Jan. 19, 1981

[30] Foreign Application Priority Data

Jan. 28, 1980 [JP] Japan .................................. 55-8626

[51] Int. Cl.³ ..................... G03G 15/08; G03G 15/09
[52] U.S. Cl. .................... 118/653; 118/657; 430/39; 430/102; 430/103; 430/122; 355/300
[58] Field of Search ................. 430/39, 102, 103, 903; 118/653, 657; 355/3 DD

[56] References Cited

U.S. PATENT DOCUMENTS

| | | | |
|---|---|---|---|
| 3,866,574 | 2/1975 | Hardenbrook et al. | 355/3 DD X |
| 3,890,929 | 6/1975 | Walkup | 355/3 DD X |
| 3,918,966 | 11/1975 | Metcalfe et al. | 430/103 |
| 4,256,818 | 3/1981 | Blossey et al. | 430/39 |
| 4,292,387 | 9/1981 | Kanbe et al. | 430/102 |

FOREIGN PATENT DOCUMENTS 45-35759  11/1970  Japan .................................. 430/39

Primary Examiner—Roland E. Martin, Jr.
Attorney, Agent, or Firm—Fitzpatrick, Cella, Harper & Scinto

[57] ABSTRACT

A method and an apparatus for developing magnetic latent image, wherein a toner bearing member holding thereon a magnetic toner having an electric charge in a particular polarity is brought closer to a magnetic latent image bearing member, and an alternating electric field is acted across the magnetic latent image bearing member and the toner bearing member to cause the toner to reciprocate between these members to visualize the magnetic latent image by the magnetic force of attraction.

7 Claims, 9 Drawing Figures

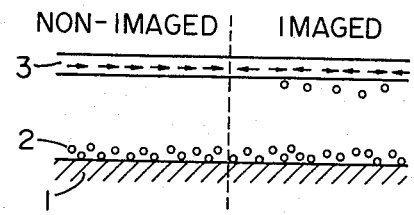
FIG. IA
PRIOR ART
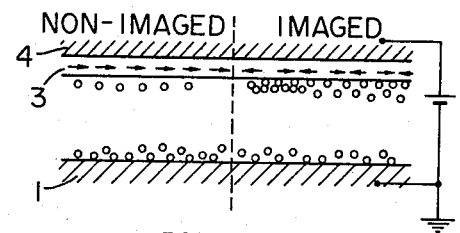
FIG. IB
PRIOR ART
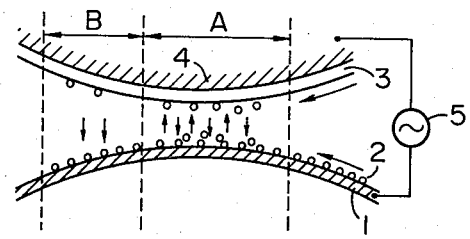
FIG. 2
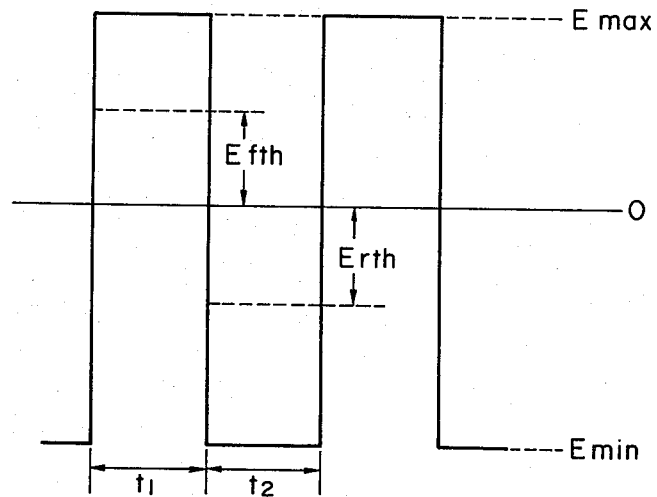
FIG. 3

METHOD AND APPARATUS FOR DEVELOPING MAGNETIC LATENT IMAGE

BACKGROUND OF THE INVENTION

1. Field of the Invention

This invention relates to a method and an apparatus for developing a magnetic latent image. More particularly, it is concerned with a method and an apparatus for developing a magnetic latent image using magnetic toner which has been imparted an electric charge in a particular polarity.

2. Description of the Prior Art

As the method for developing a magnetic latent image, there have so far been known a method, in which a toner containing a ferromagnetic material in a resin as a carrier (the so-called "magnetic toner") is spread in a thin layer on a toner bearing member, and caused to lightly contact to a magnetic latent image bearing member (as disclosed in Japanese patent publication No. 50-90342); a method, in which a toner brush is formed on a sleeve with a permanent magnet incorporated therewithin and the brush is caused to frictionally slide over the magnetic latent image bearing member (as disclosed in Japanese Patent publication No. 51-100732); and others. However, the so-called insulative toner having electric charge in a particular polarity, when it is contacted on the latent image bearing member, tends to adhere onto even a portion of the latent image bearing member where no magnetic signal is applied, due to the electrostatic adhesive force, and the adhered toner is liable to cause fogging on the white background. Further, since such insulative toner has high agglomerating property, when the toner is formed in a thick layer to facilitate light contact with the magnetic latent image, there tends to produce collected masses of toner, which makes it extermely difficult to obtain a stable thick layer of the toner. In order to prevent such electrostatic adhesion (hence fogging) and agglomeration, it may be contemplated that electric resistance of the toner is reduced to some extent. In this case, however, there arises such a problem that, when the electric resistance becomes low, it becomes difficult to perform transfer of the toner image which is once developed onto a plain paper by the corona discharge, on account of which these method are not practical.

SUMMARY OF THE INVENTION

It is, therefore, the principal object of the present invention to provide a method and apparatus for obtaining a developed image of a magnetic latent image, which overcomes the disadvantages inherent in the conventional methods, and is capable of transferring the developed image onto plain paper with sufficient clarity.

It is another object of the present invention to provide a method and an apparatus for developing a magnetic latent image, wherein a toner bearing member holding thereon a magnetic toner having an electric charge in a particular polarity is brought closer to a magnetic latent image bearing member, and an alternating electric field is acted across the magnetic latent image bearing member and the toner bearing member to cause the toner to reciprocate between these members to visualize the magnetic latent image by the magnetic force of attraction.

It is still another object of the present invention to provide a method and an apparatus for developing a magnetic latent image, wherein magnetic and electrically insulative developer is brought closer to a magnetic latent image bearing member, and an alternating electric field is acted on a developing clearance, while the field intensity in this developing clearance is being varied.

It is yet another object of the present invention to provide a method and an apparatus for developing a magnetic latent image by varying the alternating field intensity through variations in the developing clearance without varying an alternating voltage.

It is further object of the present invention to provide a method and an apparatus for developing a magnetic latent image by varying the alternating field intensity acting on the developing clearance through variations in the alternating voltage.

The foregoing objects, other objects as well as the characteristic features of the present invention will become more apparent from the following detailed description of preferred embodiments thereof, when read in conjunction with the accompanying drawing.

BRIEF DESCRIPTION OF THE DRAWINGS

In the drawing:

FIGS. 1A and 1B are explanatory diagrams for explaining the principles of conventional developing methods;

FIG. 2 is an explanatory diagram for explaining the principle of a preferred embodiment of the developing method according to the present invention;

FIG. 3 is a characteristic diagram of one example of an alternating electric field waveform to be applied in the developing method according to the present invention;

DESCRIPTION OF THE PREFERRED EMBODIMENTS

Figure 4:
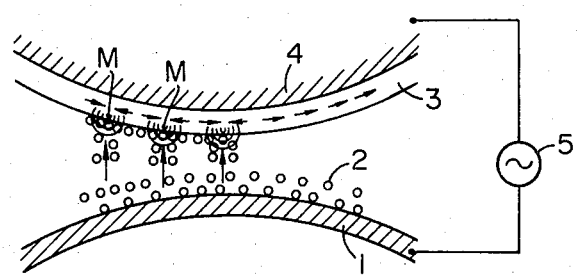
FIG. 4 is an explanatory diagram for explaining the principle of the developing method according to the present invention, in which a relationship between the magnetic field and the alternating electric field is shown.

Referring to FIG. 1A, a reference numeral 1 designates a toner bearing member, and a numeral 2 refers to a highly insulative magnetic toner. The magnetic toner is uniformly applied onto the toner bearing member to a layer thickness of from $40\mu$ to $500\mu$ by a method to be described in the latter half of the present specification. A frictional charging system is provided to charge the toner in, for example, the negative polarity by friction with the surface of the toner bearing member. A reference numeral 3 designates a magnetic latent image bearing member which is spaced apart from the toner bearing member 1 with a space gap of from $100\mu$ to $700\mu$. A space gap is also provided between this latent image bearing member and the surface of the toner layer. On account of this space gap between the latent image bearing member and the surface of the toner layer, the toner does not contact a portion of the latent image bearing member where no magnetic signal is imparted (this portion will hereinafter be called "non-imaged portion"), hence no toner adheres at all on this portion. However, in the presence of such space gap, the toner is difficult to move toward a portion of the image bearing member where the magnetic signal is imparted (this portion will hereinafter be called "imaged portion"), because the magnetic field from the magnetic latent image is a proximate force to be exerted at a close distance, hence satisfactory development cannot be done.

FIG. 1B shows a state, wherein a back surface electrode 4 is provided on the magnetic latent image bearing member to render the toner bearing member electrically conductive, or electrodes are provided to apply d.c. bias across these two electrodes, e.g., the positive voltage to the side of the latent image bearing member and the negative voltage to the side of the toner bearing member. In this case, if the negative voltage is made sufficiently large, the toner is able to migrate from the toner bearing member to the imaged portion to a satisfactory degree by dint of the electric field. At this instance, however, there also takes place simultaneously the toner transfer toward the non-imaged portion to cause the problem of the so-called "fogging" onto the background.

In the following, explanations will be given in reference to FIG. 2 as to the principle of developing the magnetic latent image according to the present invention. In the drawing, the latent image bearing member 3 rotates in the arrow direction. The toner bearing member 1 also rotates. The rotation of both members may preferably be at the same speed and in the same direction. Both latent image bearing member 3 and the toner bearing member 1 come close each other during their rotation to reach the closest region A, after which they are gradually away to a separated region B. An a.c. voltage is applied from a power source 5 across the toner bearing member 1 and a back surface electrode 4 on the latent image bearing member 3.

Now assumed that the minimum electric field required of the toner to transfer from the toner bearing member 1 to the non-image portion of the latent image bearing member 3 due to an alternating external electric field is denoted by "Efth", and the minimum electric field required of the toner, which has once transferred to the non-imaged portion of the latent image bearing member, to return (reverse-transfer) to the toner bearing member 3 is denoted by "Erth". Further assume that the maximum generated field in the phase of the a.c. voltage which acts to cause the toner to transfer from the toner bearing member to the magnetic latent image bearing member at the region A is represented by "Emax", and the minimum generated field in the phase of the a.c. voltage which acts to cause the toner to reversely transfer from the magnetic latent image bearing member 3 to the toner bearing member is represented by "Emin". These electric fields are so established as to satisfying the following inequality.

$$\text{Emax} > \text{Efth}, \text{Emin} > \text{Erth} \quad (1)$$

More preferably, $$|\text{Emin} - \text{Erth}| > |\text{Emax} - \text{Efth}| \quad (1')$$

Relationship among these fields in the above inequality is as shown in FIG. 3. It should, however, be noted that this alternating waveform is merely diagrammatic, and is not restricted to the illustrated.

When established as such, the maximum generated electric field Emax acts to cause the toner particles to transfer from the toner bearing member 1 toward the latent image bearing member 3 during a time interval $t_1$. This stage is called to the toner transfer stage. On the other hand, the minimum generated electric field Emin acts to cause the toner which has transferred to the latent image bearing member to return to the toner bearing member 1 during the time interval $t_2$. This stage is called the toner returning (or reverse-transfer) stage.

When the above inequality (1) is satisfied, the toner repeats the reciprocating motion between the magnetic latent image bearing member and the toner bearing member at the region A in accordance with a frequency of the alternating electric field. Accordingly, in this region A, sufficient amount of toner adheres to the imaged portion, and, also, a certain amount of toner adheres to the non-imaged portion. This adhesion of the toner to the non-imaged portion does not raise any problem, since it is eventually removed at the subsequent region B as will be described later. Rather, it is essential that, at this region A, adhesion of the toner to the imaged portion be made more perfect by causing the toner to be apt to adhere more or less even onto the non-imaged portion, and that the magnetic toner be adhered with the best possible faithfulness to the image density due to the magnetic field. In this manner, there can be obtained a developed image excellent in its gradation. Incidentally, when the alternating bias field is applied in a manner to further add the relationship in the above inequality (1'), it becomes possible to reduce the fogging phenomenon at the background portion in the region A to thereby made it possible to more effectively perform removal of the fogging in the subsequent region B.

Upon their arrival at the region B, the space gap between the toner bearing member and the magnetic latent image bearing member widens, owing to which the alternating field intensity acting on the space gap becomes smaller, although the voltage applied remains constant.

The boundary between the regions A and B at the non-imaged portion is a point, at which the toner transfer from the toner bearing member to the latent image bearing member can no longer take place. The relationship at this instant is considered to be as follows.

$$\text{Emax} = \text{Efth} \quad (2)$$

When the relationship becomes as in the following inequality (3), the toner movement from the toner bearing member to the latent image bearing member at the non-imaged portion can no longer take place, and there emerges a situation where the reverse-transfer (or return) of the toner from the latent image bearing member to the toner bearing member takes place one-sidedly.

$$\text{Emax} < \text{Efth}$$
$$\text{Emin} > \text{Erth} \quad (3)$$

Accordingly, the toner adhered to the non-imaged portion at this region all returns to the toner bearing member, hence no fogging on the background occurs.

On the other hand, as shown in FIG. 4, the toner at the imaged portion remains captured on the latent image bearing member due to the proximate force M of the magnetic field produced by the magnetic latent image, even though it can still perform the reciprocating motion at the closest region between the toner bearing member and the latent image bearing member. On account of this, even when both members become apart each other, the toner which has once adhered onto the latent image portion does not return to the toner bearing member, hence satisfactory developing density is insured.

Further, when the relationship becomes as follows due to weakening of the field intensity by increase of the space gap, the abovementioned reverse-transfer of the toner terminates, the instant of which stands for terminal point of the region B.

Incidentally, the arrow marks in the regions A and B as shown in FIG. 2 indicate the moving directions of the toner particles in their transfer and reverse-transfer.

The toner transfer as so far described is by utilization of the phenomenon such that the electric field intensity acting on the developing gap varies by variation in the gap as shown in FIGS. 3 and 4 without varying the alternating bias voltage to be applied. It should be noted that the manner of varying the developing gap is not always limited to the case of the two rotating members shown in FIGS. 3 and 4, but it can be done in other way such as, for example, by bringing closer and apart the developer bearing member to and from a planar latent image bearing member.

It is also possible to attain the same effect as mentioned above, without resorting to the method of varying the developing gap already described, by varying the amplitude per se of the alternating bias voltage to be applied along with the developing time. For instance, the bias electric field acting on the developing gap can be varied by connecting the a.c. bias voltage source to the developing device through a potentiometer for voltage variation, and operating this potentiometer with progress in the developing process to bring the voltage to a desired level.

In this case, if the bias electric fields Emax and Emin are so set as to satisfying the following inequality (5), the transfer quantity of the toner from the toner bearing member to the latent image bearing member can be made larger than its reverse-transfer quantity.

$$|Emax - Efth| > |Emin - Erth| > 0 \quad (5)$$

Also, in the case of:

$$|Emax - Efth| < |Emin - Erth| \quad (6),$$

the reverse-transfer quantity of the toner can be made larger than its transfer quantity.

In either case as mentioned above, the important thing is that there is a limitation to the frequency of the alternating field to be applied. In other words, when the frequency is increased, the value γ becomes gradually large, whereby the effect of augmenting the gradation declines. The cause for this may be considered as follows. In the developing process where the alternating field is applied, a finite response time is required for the toner to perform the reciprocating motion without failure when the toner particles repeat their transfer and reverse-transfer between the toner bearing member surface and the latent image forming surface. In order that the intermediate tone of the image density may be reproduced, the toner which has been subjected to the electric field of a certain threshold value and above should be accurately transferred within a half cycle of the alternating field. For this purpose, the alternating field should advantageously be of a low frequency, and a particularly favorable gradation is obtainable at such low frequency region. When the frequency is increased, the gradation lowers. Usually, the frequency of 1 KHz or below is preferred, although a frequency of 1 KHz and above does not raise any problem for the purpose of digital recording, and a frequency of upto and including 10 KHz is sufficiently useful.

On the other hand, when the frequency is too low, the reciprocating movement of the toner is not sufficiently repeated during passage of the latent image forming surface through the developing section with the result that irregularity in development tends to occur readily on the image caused by a.c. voltage. Experimental results reveal that, upto 60 Hz of the frequency, fairly good image could be obtained, and below 60 Hz, irregularity occurred in the developed image. It was discovered that the lower limit of the frequency for avoiding such non-uniformity in the developed image depends particularly on the developing conditions, inter alia, the developing speed (also called "process speed") Vpmm/sec.

In this experiment, since the moving speed of the latent image forming surface is 200 mm/sec., the lower limit of the frequency is $60/100 \times Vp = 0.3 \times Vp$ (Hz).

As stated in the foregoing, in order to improve the gradation of the image and remove the ground fogging, it is preferable that an appropriate combination of the frequency and the field intensity be established.

It has been verified that the waveform of the alternating filed to be applied may be any of sinusoidal, rectangular, triangular, serrated, or asymmetrical forms of these waveforms with equal effect. It is also permissable that the time interval of the toner transfer phase differs from that of the toner reverse-transfer phase.

With a view to realizing the abovementioned development, it is the requisite condition that the toner layer on the toner bearing member be as thin and uniform as possible. The present invention is also to provide a method and a means for feeding and applying the toner which is suitable for developing the magnetic latent image by the above-described developing method.

In the following, preferred embodiments of the developing device according to the present invention will be explained in reference to the accompanying drawing.

Embodiment 1

Figure 5:
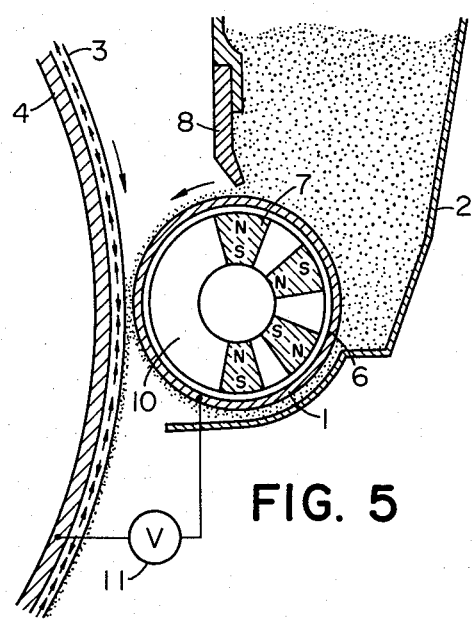
FIGS. 5 and 6 are cross-sectional views of preferred embodiments of the developing apparatus to effect the method of the present invention.

Reference is had to FIG. 5 illustrating one preferred embodiment of the developing device according to the present invention. The device is of such a type that the alternating bias electric field intensity is varied by varying the developing gap. In this embodiment, the toner bearing member is a non-magnetic sleeve 6 with a permanent magnet 7 incorporated in its interior. A reference numeral 8 designates a magnetic (iron-made) blade provided in confrontation to a position of one of the main magnetic poles of the permanent magnet 7. The blade 8 is held with a space gap of 200 microns from the surface of the sleeve 6 so as to form a thin layer of the toner on the sleeve by the action of the magnetic field. The toner is composed of a resin material such as polystyrene, polyester, etc. as a carrier, and a magnetic material such as ferrite, magnetite, etc. dispersed in the carrier resin in an amount of from 25 to 60% by weight or so. Further, depending on necessity, a charge controlling agent, a coloring matter, etc. may be added. A numeral 11 refers to a power source for applying the alternating electric field which performs the abovementioned action. For the alternating electric field, there is used an alternating current having a frequency of 600 Hz and an amplitude of 1600 Vp-p (peak-to-peak value), on which a direct current of 100 V is superposed. Such asymmetrical alternating current is, of course, only an example, and there may be used various alternating waveforms such as rectangular, triangular, pulse-shaped waveforms. The toner which has been regulated to a coating thickness of approximately 80 microns by the action of the magnetic field is held on the sleeve by the electrostatic adhesive force and is conveyed to the developing position by rotation of the sleeve 6. In the vicinity of the developing position, no magnet is provided within the sleeve 6 with a view of preventing the magnetic latent image from being destroyed by the magnetic force of the magnet. It should be particularly noted that the use of the toner feeding and applying method and the developing method according to this embodiment, as mentioned at the foregoing, makes it possible to take as broad a region as possible, where no magnet is disposed, as designated by a numeral 10 in FIG. 5. The efficacy of this will be evident when compared with a case of performing ordinary magentic brush development, for example. That is to say, in the magnetic brush development, since the brush needs be formed at the developing position, the magnetic field should inevitably be provided at that position, on account of which possibility of destroying the magnetic latent image is great.

It is, of course, possible to provide magnetic poles of an extent that does not destroy the magnetic latent image. According to the experiments, favorable development is effected in some occasion where very small degree of magnetic poles are present at the developing section. However, even in this case, the magnetic brush of an extent that is usually adopted in the ordinary magnetic brush development should not be used.

Embodiment 2

Figure 6:
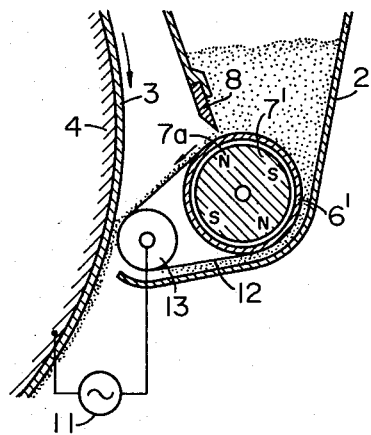

Referring now to FIG. 6, a reference numeral 12 designates the toner bearing member in the form of an endless belt made of stainless steel or an electrically conductive rubber. A numeral 6' refers to a rotational sleeve with a fixed magnet 7' incorporated in its interior. A numeral 6 refers to a magnetic (iron-made) blade provided at a position confronting to one of the principal magnetic poles (7a) of the fixed magnet 7' with a space interval of from 100 to 400 microns being taken from the sleeve surface. By the action of the magnetic field between the magnetic pole 7a and the blade 8, the toner 2 is uniformly placed on the toner bearing member 12 to a layer thickness of from 50 to 300 microns as the sleeve rotates. The toner bearing member 12 is opposed to the magnetic latent image bearing member 3 by way of a roller 13 with a space gap being provided therebetween, whereby the development is carried out. The reason for separately providing the roller 13 from the sleeve 6' to form the developing section is to prevent the magnetic latent image from being destroyed by the magnetic field generated. A reference numeral 11 designates a power source for applying an a.c. voltage of the afore-mentioned nature to the roller 13. The toner 2 is insulative and given an electric charge by friction with the surface of the toner bearing member. The toner which has once been applied onto the sleeve by the blade 8 is conveyed to the developing section by the electrostatic adhesive force with the toner bearing member, whereby favorable development is done as mentioned in the foregoing.

Figure 7:
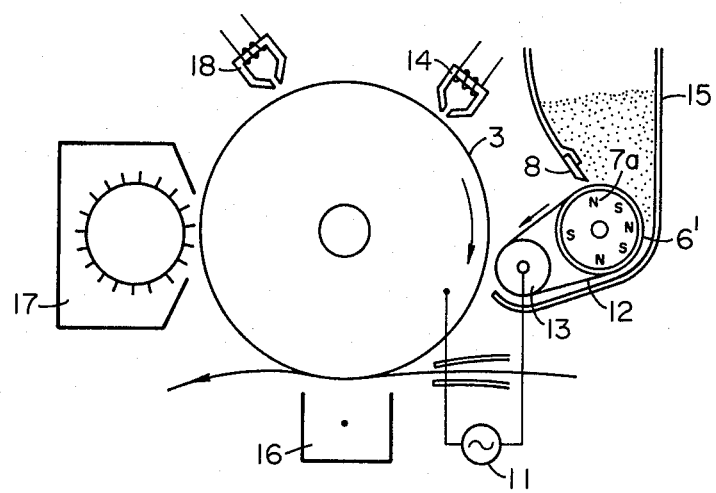
FIG. 7 is a schematic diagram, in cross-section, of one embodiment of an overall construction of the image forming apparatus, in which the embodiment of the developing apparatus shown in FIG. 6 is incorporated.

FIG. 7 schematically shows an overall construction of a concrete image forming apparatus incorporating therein the embodiment of the developing device shown in FIG. 6 according to the present invention. A reference numeral 3 designates a drum-shaped bearing member for a magnetic latent image formed by a magnetic recording head 14. The drum 3 rotates in an arrowed direction. The latent image bearing member 3 may, of course, be in any other shape such as belt-shape, etc.

A numeral 15 refers to a device for developing the magnetic latent image, the details of which have been mentioned in the foregoing. As one concrete example of this developing device, the magnetic toner consists of 50% of styrene/acrylic resin, 48% by magnetite, and 2% of negative charge controlling agent (all being by weight percent), and is negatively charged. The magnetic toner is regulated its thickness by the magnetic blade 8 disposed at a space interval of 250 microns from the surface of the toner bearing member 12. In this instance, the toner particles are erected in ears to make a curtain form by dint of the magnetic field between the blade 8 and the magnetic pole 7a beneath the surface of the toner bearing member (having the surface magnetic flux density of 700 gausses), and then this curtain-shaped toner layer is doctored by the blade 8, hence the final toner layer thickness becomes approximately 100 microns. The thus thinly coated toner layer is conveyed to the developing position with rotation of the toner bearing member and fed for the image development under the alternating electric field as mentioned above. The alternating bias source 11 in this case is an alternating current having a frequency of 600 Hz and an amplitude of 1600 Vp-p, on which a direct current of +100 V is superposed. The process speed at this time is 200 mm/sec. In this manner, there can be obtained a developed image free from the fogging and rich in the gradation as mentioned in the foregoing, and the developed image is forwarded to an image transfer position where it is transferred by a corona discharger 16. After the image transfer, the latent image bearing member is subjected to cleaning of residual toner by a well known cleaning means 17. Finally, the latent image bearing member is de-magnetized by a de-magnetizing head 18 to be ready for the subsequent use.

Embodiment 3

Figure 8:
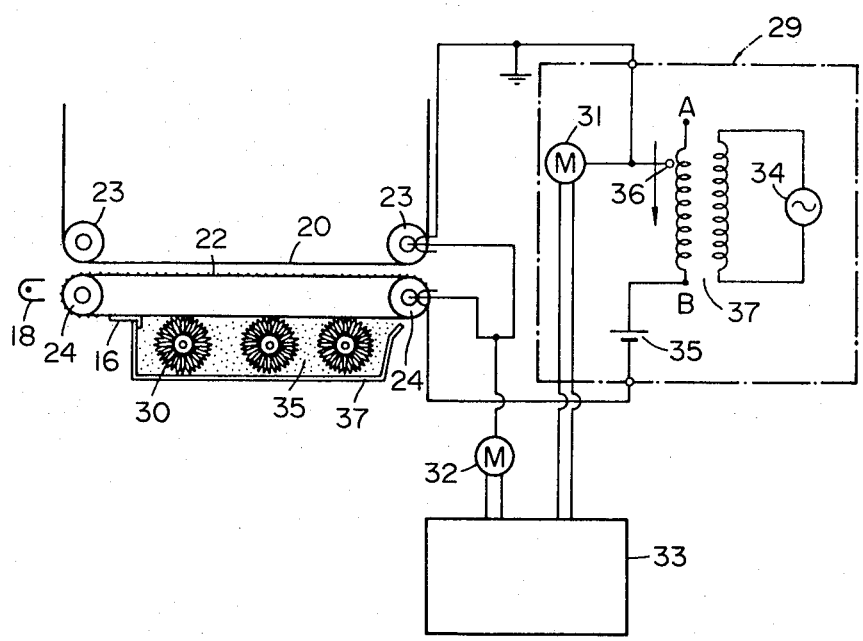
FIG. 8 is a schematic block diagram showing another embodiment of the present invention.

The embodiment shown in FIG. 8 is of such a construction that an alternating voltage for bias application is attenuated. That is, a source voltage consisting of a d.c. component superposed on a low frequency a.c. voltage is attenuated by the use of a mechanical sliding electrode.

In the drawing, a reference numeral 20 designates a magnetic recording medium, which is subjected to latent image formation at a separate location (not shown), is forwarded to a developing section (as shown) by rollers 23, 23, stays at this section during the developing operation, and is further forwarded for the image fixing. A numeral 22 refers to a toner bearing member in belt form made of an electrically conductive rubber. This toner bearing member is driven by metal rollers 24, 24. The magnetic recording medium as the latent image bearing member 20 and the toner bearing member 22 are intermittently driven by the rollers 23, 24 and motors 31, 32 to be forwarded to the developing section. They stand still at the developing section during the developing process, and are moved prior to the subsequent developing process. The toner bearing member rotates in its half way and stops again. A reference numeral 35 designates an insulative toner stored in a vessel 37. The toner is composed of 3% by weight of carbon black and 2% by weight of a positive charge controlling agent, both being dispersed in styrene resin as a carrier. For improvement in fluidity of the toner particles, 0.2% by weight of colloidal silica may be added. The toner is conveyed on the toner bearing member 22. During the conveyance, the toner is regulated to a layer thickness of from 100 to 200 microns by means of a member 26 in sliding-contact therewith. The toner is further imparted the positive charge by a corona charge 28 prior to the development. A space gap between the magnetic latent image bearing member 20 and the toner bearing member 22 is maintained at 500 microns. A reference numeral 24a designates a sliding electrode which contacts a core metal of the rotational roller 24. The sliding electrode applies a.c. voltage to the toner bearing member 22 from a power source 29. A numeral 30 refers to a fur brush to stir the developing agent and to feed it to the toner bearing member 22.

The applied voltage is an alternating current, on which a direct current is superposed. 0.2 second after commencement of the development, the a.c. voltage alone is caused to attenuate with a time constant of approximately 0.5 second.

In the following, explanations will be given as to the construction of the power source 29 to effect such attenuation. A reference numeral 31 designates a motor to move the sliding electrode 36 at the secondary side of an a.c. transformer 37, a numeral 34 refers to an a.c. power source, 35 a d.c. power source, and 33 a power source for a timing signal generating circuit and motors 31, 32.

After a lapse of 0.2 second from start of the development, the sliding electrode 36 begins to move from the position A to the position B in 0.5 second at a constant speed. Upon movement of the sliding electrode 36 to the position B, the motor 32 is driven to half-rotate the toner bearing member 22, during which the sliding electrode returns to the position A.

The non-imaged portion of this image is substantially free from the ground fogging, and the gradation thereof was excellent.

It should be noted that the present invention is not limited to the afore-described embodiments, but includes all the possible embodimental concepts which fall within the ambit of the present invention.

Since the present invention provides a method and an apparatus for developing a magnetic latent image which is characterized in that a toner bearing member carrying thereon a magnetic toner having electric charge in a particular polarity is brought closer to a rotating magnetic latent image bearing member, and an alternating electric field is acted on a gap between the abovementioned magnetic latent image bearing member and toner bearing member, to cause the toner to reciprocate between the magnetic latent image bearing member and the toner bearing member, to thereby visualizing the abovementioned magnetic latent image with the toner due to the magnetic force of attraction, it has such effects that the problems inherent in the conventional method and apparatus are totally solved, and the developed image free from fogging and excellent in the gradation can be produced.

What we claim is:

1. A magnetic latent image developing device, comprising:

magnetic latent image bearing means;

toner bearing means disposed in confrontation to said magnetic latent image bearing means, said toner bearing means carrying thereon a magnetic toner having electric charge of a particular polarity; and means for applying an alternating electric field at the clearance between said magnetic latent image bearing member and said toner bearing member;

wherein there is no magnetic field in the clearance other than the magnetic field formed by the magnetic latent image.

2. The developing device as set forth in claim 1, further comprising:

toner layer regulating means made of a magnetic material disposed at a predetermined position over against said toner bearing means with a very fine space gap being maintained between said means and the surface of said toner bearing means; and magnets disposed inside said toner bearing means at a position opposite to the position of said toner layer regulating means, both said toner layer regulating means and said magnets forming a section where said toner is applied on said toner bearing means in a layer form by a magnetic field action between said toner layer regulating means and said magnets, and the toner as applied thereon being conveyed to a developing position by the electrostatic force of adhesion with said toner bearing means.

3. The developing device as set forth in claim 2, wherein said toner bearing means is in the form of an endless belt which is driven by a plurality of rollers, one part of which forms said developing section, and the other part of which forms the toner applying section.

4. The developing device as set forth in claim 1, wherein said applying means includes means to vary the intensity of the alternating field by varying the a.c. voltage.

5. The developing device as set forth in claim 1, wherein said image bearing means and toner bearing means are constructed and arranged to vary the clearance therebetween and thereby vary the intensity of the alternating field.

6. The developing device as set forth in claim 1, wherein the following relationship is satisfied at least at the closest part between said magnetic latent image bearing means and said toner bearing means:

$$Emax > Efth, \quad Emin > Erth$$

(where: Efth denotes the minimum electric field required of the toner to transfer from said toner bearing means to a portion of said magnetic latent image bearing means where no magnetic signal is formed;

Erth denotes the minimum electric field required of the toner to reverse-transfer to said toner bearing means from the portion on said magnetic latent image bearing means where no magnetic signal is formed;

Emax represents the maximum electric field in the phase of said alternating electric field acting to transfer said toner from said toner bearing means to said magnetic latent image bearing means; and Emin represents the maximum electric field in the phase of said alternating electric field acting to cause said toner to reverse-transfer from said magnetic latent image bering means to said toner bearing means).

7. The developing device as set forth in claim 1, wherein the following relationship is satisfied:

$$0.3 \times Vp < f < 10{,}000$$

(where: Vp denotes the moving speed (mm/sec.) of said magnetic latent image bearing means; and
f represents a frequency (Hz) of said alternating electric field).

* * * * *

UNITED STATES PATENT AND TRADEMARK OFFICE
CERTIFICATE OF CORRECTION

PATENT NO. : 4,368,687

DATED : January 18, 1983

INVENTOR(S) : JUNICHIRO KANBE, ET AL.

It is certified that error appears in the above-identified patent and that said Letters Patent is hereby corrected as shown below:

Column 1, line 46, "method" should read --methods--.

Column 2, line 12, insert --a-- after "is".

Column 3, line 36, insert --to-- after "close".

Column 4, line 7, delete "to";
         line 26, "even" should read --evenly--;
         line 35, "made" should read --make--.

Column 5, line 26, "way" should read --ways--.

Column 6, line 8, "upto" should read --up to--;
         line 16, "upto" should read --up to--;
         line 32, "filed" should read --field--.

Column 7, line 27, insert --to-- after "needs";
         line 47, "6" should read --8--.

UNITED STATES PATENT AND TRADEMARK OFFICE
CERTIFICATE OF CORRECTION

PATENT NO. : 4,368,687

DATED : January 18, 1983

INVENTOR(S) : JUNICHIRO KANBE, ET AL.

It is certified that error appears in the above-identified patent and that said Letters Patent is hereby corrected as shown below:

Column 8, line 21, "its" should read --in--.

Column 11, line 4, "bering" should read --bearing--.

Signed and Sealed this

Sixth Day of September 1983

[SEAL]

Attest:

GERALD J. MOSSINGHOFF

Attesting Officer

Commissioner of Patents and Trademarks